July 31, 1951 G. CORDONNIER 2,562,297
PROJECTION MICRODOCUMENT READING LAMP DEVICE
Filed Aug. 1, 1946 2 Sheets-Sheet 2
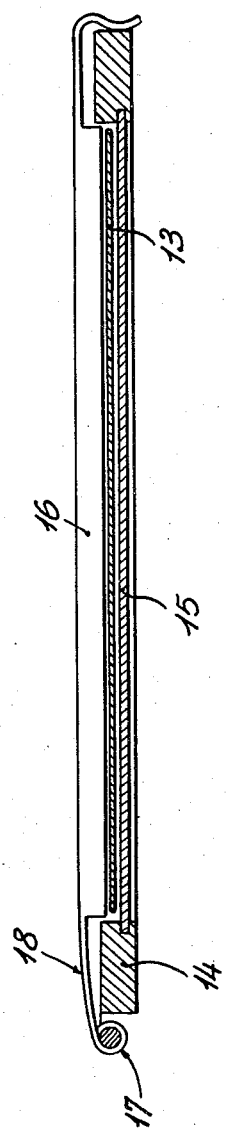
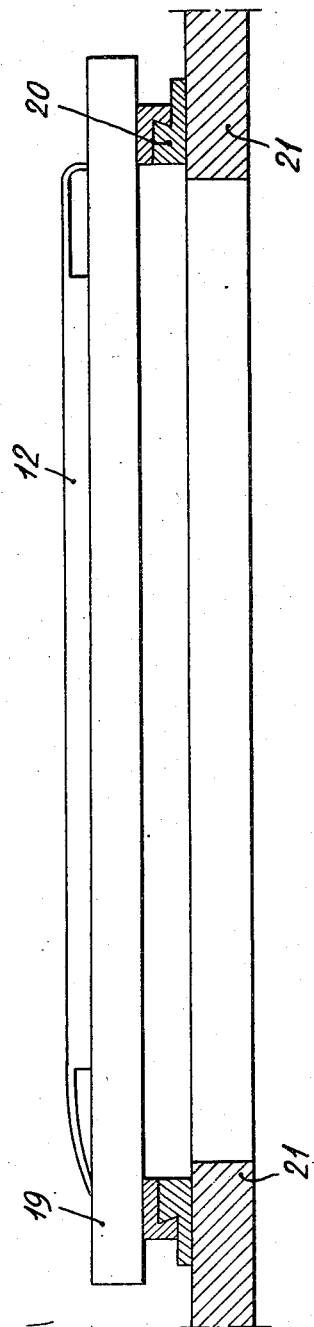
Inventor
G. Cordonnier
By Wenderoth, Lind & Ponack
Attorneys Patented July 31, 1951

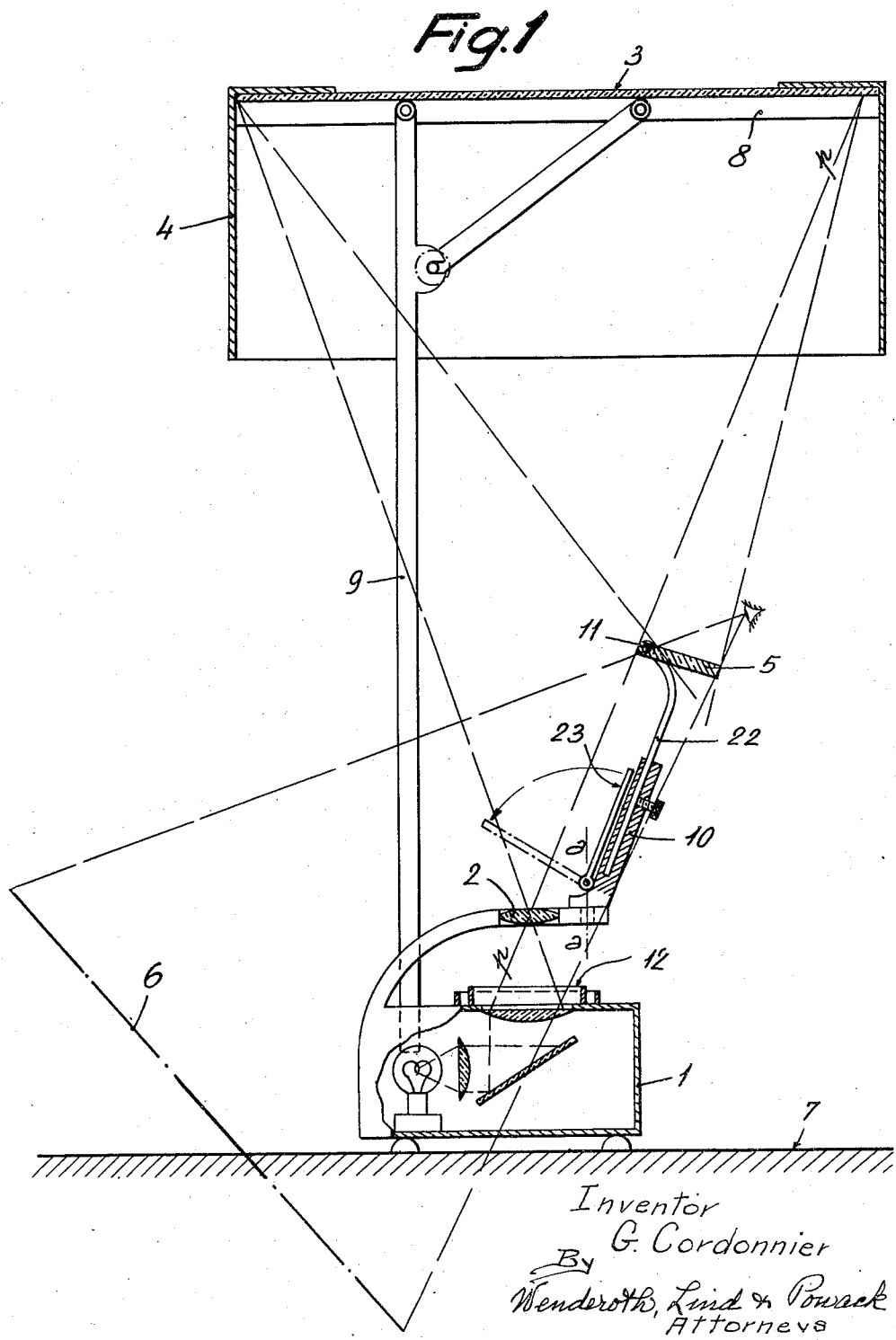

2,562,297

UNITED STATES PATENT OFFICE 2,562,297

PROJECTION MICRO-DOCUMENT READING LAMP DEVICE

Gérard Cordonnier, Paris, France

Application August 1, 1946, Serial No. 687,557
In France July 7, 1942

Section 1, Public Law 690, August 8, 1946
Patent expires July 7, 1962

8 Claims. (Cl. 88—24)

1

The present invention relates to a "micro reading lamp" designed for the examination of photographs of small scale, and all micro documents.

There exist at present actually two kinds of apparatus adapted to this end, namely projection apparatus and eyepiece apparatus. We shall give briefly the characteristics of both in order to render more precise the particulars of the present invention.

The first class of apparatus form a real image magnified on a screen, and this diffusing image is examined either by reflectors for opaque screens, or by transparency for translucent screens.

The scale of magnification is very large in the case of a collective examination of documents, but rather small in the case of an individual examination. The image is projected either on a nearly vertical screen or on an almost horizontal screen above a work table. In certain of these apparatus the light beams are formed in one or several mirrors.

In all cases the image must be thoroughly protected against external diffuse light, and a relative darkness is preferable in the projection room, or the individual screen must be protected by walls encumbering the work table. In the two cases there results an important annoyance, not allowing the immediate examination of micro documents without interrupting the work.

It must be added, to the detriment of individual apparatus, that their arrangement is generally such that the micro document is placed too high above the work table and that its manipulation can lead to a great fatigue of the arms.

The second type of apparatus, monocular or binocular, lenses or microscopes, form a virtual image sufficiently luminous not to need examination in darkness.

A lens is relatively cheap but of mediocre optical quality, and its defects on the borders of the field produce an intense fatigue after a prolonged reading.

A binocular microscope of high price does not produce much fatigue and the operator is capable of effecting a regulation thereof perfectly adapted to his vision. But the eyes must then have a very precise position corresponding to the ocular rings of the instrument. The fixity of the head thus demanded quickly becomes extremely painful and generally incompatible with the freedom of mind necessary to brain work.

It is apparent from the preceding descriptions that the different micro reading apparatus are not at all adaptable in practice on account of

2 their different inconveniences, including obligation to darken the work room, encumbrance of the desk, difficulties of manipulation, fatigue of examination.

That is why micro documentation, in spite of its advantages for the diffusion, the conservation and the classification of documents has only been regarded hitherto as a helping means only to be employed in the case where it is possible to procure documents edited to the usual dimensions.

One of the essential objects of the present invention is to obtain a new arrangement of known elements avoiding entirely the foregoing inconveniences and realizing at the same time other possibilities. The use of apparatus with eyepieces being incompatible with a prolonged and comfortable reading the new apparatus is of the projection type. But to avoid the inconveniences noted above, the projected image will be rendered virtual without at the same time introducing eyepieces. Amongst the advantages which result from this arrangement will be mentioned the possibility of placing within reach the mechanism of manipulation, and of suppressing the encumbrance of the screen and of the hood walls which are no longer found in the working zone.

According to one example the projection lamp forms the pedestal of the instrument, the image is projected on to a horizontal screen suspended from or carried by light mountings connecting it either to the pedestal of the instrument or at the work table. This screen is protected by a suspended hood such that the feeble diffuse light coming from the work table can reach the screen, with the exclusion of the direct light from the windows.

Such an apparatus can be used directly for reading by invalids in bed or in a long chair by installing the apparatus as a bedside lamp in the immediate neighbourhood of the reader, the screen being suspended above the head at a suitable distance.

For normal reading a small mirror connected to the orientable pedestal and placed at eye level before or behind the projecting beam of light gives finally a virtual image of the magnified document inclined before the observer.

In placing himself in the neighbourhood of the mirror the observer will see in its entirety all the virtual image but it will be allowable to sink himself down on his couch to the detriment of his field of vision.

A manipulation at easy distance of the document or of the mirror will permit him to make pass before him any part of the document in proportion to his reading.

The platform supporting the micro documents will be provided to pass the standard microfilms or any other assembly of micro copies such as a micro slide of usual size 105 x 148 presenting four ranges of 8 micro copies corresponding to 32 pages of text. In this latter case auxiliary apparatus permit without regulation, of examining automatically such or such page and of passing automatically to the following.

One might thus for example, only read, in a sequence of slides to be examined, the first pages giving summaries or the last giving conclusions of the elements reproduced. This whole of known elementary arrangements leads thus to obtaining an apparatus allowing a more rapid and more comfortable consultation of documents.

It goes without saying that other complementary apparatus can easily be adjoined to the micro reader without forming an invention distinct from the first. One might thus for example examine moving images or images in relief.

Finally to annul completely the practical encumbrance of the micro reader which can moreover be dismountable for its transport, the whole can be provided to replace advantageously one of the accessories of the work table, the portable lamp. In fact in absence of the micro document, with or without an objective (shuffleable for example) the condenser of the lamp could project on the upper screen all the light from the lamp. The screen will diffuse this light on the work table and in a limited field around it. This indirect lighting will be of a yield much superior to that of the usual lamps lighting uselessly the ceiling while dispersing exaggeratedly the light. There will be obtained thus a lighting conforming to hygienic vision and which will be at the same time in accordance with the orders for passive defence.

By way of example and to facilitate the understanding of the description, there have been shown in the appended drawings.

Fig. 1 is a schematic view of the whole of an apparatus according to the invention.

Fig. 2 is the view in lateral elevation of a slide carrying frame destined to be used in this apparatus.

Fig. 3 is a lateral view in partial sectional elevation showing how the slides for receiving the frame are arranged.

In this example the optical system, diagrammatically represented as 1, can comprise as is well known a lamp with or without a mirror, a condenser in one or several pieces and an objective 2 forming a real image on the screen 3.

The screen will be formed by a plaque made of any suitable material resting on lateral straight edges 8, in the form of angle irons which are supported by vertical mountings 9. These mountings and angle irons are preferably dismountable and foldable so as to be capable of being lodged as well as the screen in a work portfolio or a trunk of small dimensions. The mountings are for example mounted by ample sinking down of their lower extremities on the box 1 containing the projection mechanism so that the whole apparatus may be easily displaceable and may be arranged on any table or desk. But the screen could equally well be carried by the table or fixed.

It is to be remarked that the mounting of the screen on two vertical mountings only leaves possible slight lateral displacements of the screen which do not imply appreciable alteration of distance relative to the objective of the projection apparatus so that lateral movements of the screen, possible by reason of the lightness of the mountings will not produce any defect of focusing nor of apparent displacement of the image capable of producing eye strain. The screen 3 is surrounded by a hood 4 of fabric which protects it from diffused light.

The mirror 5 of regulable position allows of examining the projection by its virtual image. This mirror is preferably mounted on a strap 10 pivoting around a vertical axis a—a which allows the observer to place himself either directly opposite, or on one side, and can particularly be advantageous for the examination of micro documents legible downwardly and across.

Preferably the mirror is mounted in conditions such that its edge 11 coincides approximately with one edge of the beam of light. This arrangement is most favourable to a non-oblique observation of the image projected on the screen 3. In the example represented the mirror is mounted by the aid of a rod 22 sliding parallel to the limit plane p—p of the beam of light and pivoting on a horizontal axis 11 which coincides exactly with the side of the beam of light so that the observer can read the document under the best conditions whatever may be the height and the orientation in which he places the mirror.

The apparatus can comprise moreover an auxiliary mirror 23 mounted for example on the support 10 and capable of turning itself into the position indicated in dotted lines on the drawing to project the document no longer on screen 3 but on an auxiliary screen, mural for example, for direct visibility by a large number of persons. This arrangement will be particularly suited to conferences.

The bowl containing the lamp carries on the other hand an opening frame 12 in which is arranged the micro document 13. This frame, visible in Fig. 2 is composed preferably of a frame proper 14 provided with a glass 15 and with a glazed cover 16 which opens by rotation around a hinge 17. The cover 16 is connected to the hinge 17 by leaf springs 18 so that its parallelism to the glass 15 is assured whatever may be the thickness of the micro document 13. The frame thus constituted is supported by slides 19 which allow of its sliding from front to back and which are themselves mounted on a second set of slides 20 allowing displacement laterally. It is thus possible by a displacement of the frame effected by hand to make to pass successively under the objective the different pages of a photographic work on the micro document or the different parts of the view of a whole.

Although the present invention has been described in relation to a method of carrying it out it is clear that it is in no way limited to the said example, that the latter is capable of variations and modifications which will be apparent to the expert.

I claim:

1. An apparatus for the observation of microdocuments comprising in combination: a casing, a projection apparatus therein capable of being placed upon the work table of the operator, a supporting plate holder for the micro-documents, an opaque screen protected from diffused light for receiving the projected image of the micro-documents, means supporting said opaque screen in projection position above the projecting apparatus, reflecting mirror means located above and at one side of the projection apparatus between the latter and the screen and in the field of the sight of the operator whereby the projected images on the screen may be viewed.

2. An apparatus as set forth in claim 1 wherein a hood surrounds said screen to protect it from exterior light.

3. In an apparatus as set forth in claim 1, a micro-document carrying frame comprising two frames proper which are glazed, one being mounted on the other by means of a hinge and one of said frames being connected to said hinge by leaf springs.

4. An apparatus for the observation of microdocuments comprising in combination: a casing, a projection apparatus therein capable of being placed upon the work table of the operator, a supporting plate holder for the micro-documents, an opaque screen protected from diffused light for receiving the projected image of the micro-documents, means supporting said opaque screen in projection position above the projecting apparatus, reflecting mirror means located above and at one side of the projection apparatus between the latter and the screen and in the field of the sight of the operator whereby the projected images on the screen may be viewed, and means for adjusting the position and orientation of said mirror.

5. An apparatus for the observation of microdocuments comprising in combination: a casing, a projection apparatus therein capable of being placed upon the work table of the operator, a supporting plate holder for the micro-documents, an opaque screen protected from diffused light for receiving the projected image of the micro-documents, means supporting said opaque screen in projection position above the projecting apparatus, reflecting mirror means located above and at one side of the projection apparatus between the latter and the screen and in the field of the sight of the operator whereby the projected images on the screen may be viewed and two mountings for said screen substantially parallel to the projection axis.

6. An apparatus for the observation of microdocuments comprising in combination: a casing, a projection apparatus therein capable of being placed upon the work table of the operator, a supporting plate holder for the micro-documents, an opaque screen protected from diffused light for receiving the projected image of the micro-documents, means supporting said opaque screen in projection position above the projecting apparatus, reflecting mirror means located above and at one side of the projection apparatus between the latter and the screen and in the field of the sight of the operator whereby the projected images on the screen may be viewed, and two substantially vertical mountings for said screen, said mountings being dismountable and carried by the projection apparatus.

7. An apparatus for the observation of micro-documents comprising in combination: a casing, a projection apparatus therein capable of being placed upon the work table of the operator, a supporting plate holder for the micro-documents, an opaque screen protected from diffused light for receiving the projected image of the micro-documents, means supporting said opaque screen in projection position above the projecting apparatus, reflecting mirror means located above and at one side of the projection apparatus between the latter and the screen and in the field of the sight of the operator whereby the projected images on the screen may be viewed, a strap mounted to pivot about a vertical axis and said reflecting mirror means being mounted on said strap to pivot about a horizontal axis.

8. An apparatus for the observation of micro-documents comprising in combination: a casing, a projection apparatus therein capable of being placed upon the work table of the operator, a supporting plate holder for the micro-documents, an opaque screen protected from diffused light for receiving the projected image of the micro-documents, means supporting said opaque screen in projection position above the projecting apparatus, reflecting mirror means located above and at one side of the projection apparatus between the latter and the screen and in the field of the sight of the operator whereby the projected images on the screen may be viewed, and said reflecting mirror means having one edge thereof nearest the light beam and being limited in its movement thereby.

GÉRARD CORDONNIER.

REFERENCES CITED

The following references are of record in the file of this patent:

UNITED STATES PATENTS

| Number | Name | Date |
|---|---|---|
| 1,332,413 | Robertson | Mar. 2, 1920 |
| 1,460,600 | Palmer | July 3, 1923 |
| 1,624,816 | Triana et al. | Apr. 12, 1927 |
| 1,870,823 | Ross | Aug. 9, 1932 |
| 1,889,575 | Sebille | Nov. 29, 1932 |
| 1,894,004 | Rose | Jan. 10, 1933 |
| 1,951,054 | Kennedy | Mar. 13, 1934 |
| 1,974,654 | May | Sept. 25, 1934 |
| 1,994,543 | Stenz et al. | Mar. 19, 1935 |
| 2,008,982 | Hopkins | July 23, 1935 |
| 2,174,778 | Croft | Oct. 3, 1939 |
| 2,254,368 | Holbrook | Sept. 2, 1941 |
| 2,258,382 | Goebel | Oct. 7, 1941 |
| 2,361,398 | Harris et al. | Oct. 31, 1944 |
| 2,369,248 | Pratt | Feb. 13, 1945 |